D. GAST & A. WERTZ.
LOCK NUT.
APPLICATION FILED MAY 22, 1913.

1,097,218.

Patented May 19, 1914.

Witnesses
Jos. J. Hysler.
E. P. Schlosser.

Inventors
Dwight Gast
Ambrose Wertz

By Ofed L. Billman
Attorney

UNITED STATES PATENT OFFICE.

DWIGHT GAST, OF CLEVELAND, AND AMBROSE WERTZ, OF SEVILLE, OHIO.

LOCK-NUT.

1,097,218. Specification of Letters Patent. Patented May 19, 1914.

Application filed May 22, 1913. Serial No. 769,129.

*To all whom it may concern:*

Be it known that we, DWIGHT GAST and AMBROSE WERTZ, citizens of the United States, residing at Cleveland and Seville, respectively, in the counties of Cuyahoga and Medina, respectively, and State of Ohio, have invented certain new and useful Improvements in Lock-Nuts, of which the following is a specification.

Our invention relates to improvements in lock nuts, the primary object being to provide a generally improved lock nut of exceedingly simple, cheap, and efficient construction, which may be readily and securely locked at any desired place on the bolt, and which will readily take up wear and adjust itself to the threads of the bolt, and may be operated in practice without injury to the threads of either the nut or bolt.

A further object is to provide an improved lock nut blank formed of a single piece or length of material adapted to be readily bent to form the completed lock nut so that the latter may be readily and cheaply formed, the threaded portion of the lock nut being preferably of hardened steel so that as the threads on the bolt become worn, the split portions of the lock nut may be adjusted or drawn together to not only take up wear, but cut threads in the bolt so as to prevent slipping or other injury to the threads.

A still further object is to provide an improved lock nut in which the clamping or locking device may be readily operated with an ordinary wrench.

With the above-mentioned and other ends in view, the invention consists in the novel construction, arrangement, and combination of parts, hereinafter described, illustrated in some of its embodiments in the accompanying drawings, and particularly pointed out in the appended claims.

Figure 1:
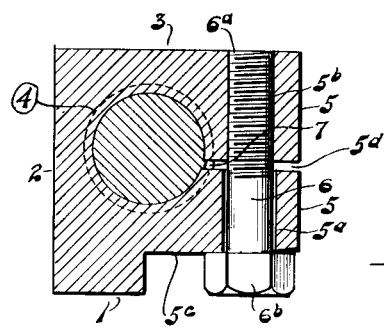
Figure 2:
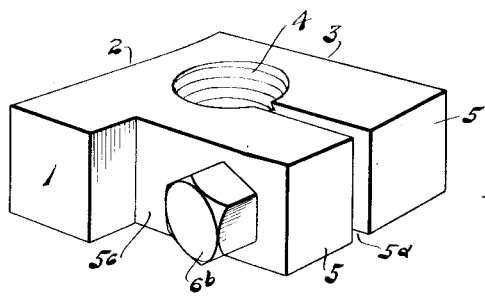
Figure 3:
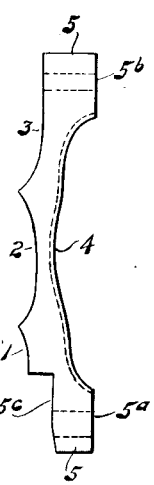
Figure 4:
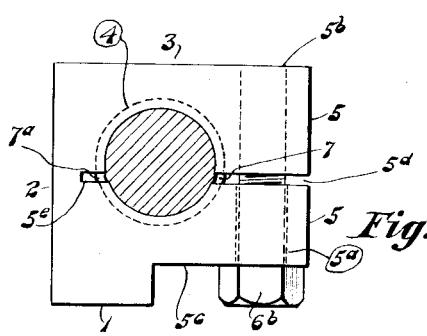

Referring to the drawings, forming a part of this specification, Figure 1, is a cross sectional view of the improved lock nut in its operative or locking position applied to an ordinary threaded bolt. Fig. 2, a perspective view of the improved lock nut, detached. Fig. 3, a side elevation of the improved lock nut blank, on a reduced scale, before being bent or formed up. Fig. 4, a side elevation of a modified form of lock nut operatively applied to an ordinary threaded bolt.

Similar numerals of reference designate like parts throughout all the figures of the drawings.

The improved lock nut is adapted to be formed from a single length or blank of material shown on a reduced scale in Fig. 3, of the drawings, said blank comprising an irregularly shaped body curved on one side and of angular shape on the other to form the sides 1, 2, and 3, of the lock nut when formed or completed, as shown in Figs. 1, 2, and 4, of the drawings. The curved side of the blank may be threaded as at 4, so that when the blank is formed up it will form the threaded opening 4, in the completed nut, as shown in the other figures of the drawings.

The ends 5, of the blank are provided with openings $5^a$, and $5^b$, the opening $5^b$, being of reduced diameter and threaded to receive the threaded portion $6^a$, of the cap screw 6. The opening $5^a$, is adapted to loosely receive the unthreaded portion of the cap screw 6, to provide for the requisite relative movements of the parts as the adjacent split ends 5, are drawn toward or from each other in the act of locking and unlocking the nut upon the bolt. The end 5, provided with the larger opening $5^a$, is inset as at $5^c$, said inset portion $5^c$, being of a depth corresponding to the thickness of the hexagon head $6^b$, of the cap screw, and being of sufficient length to readily receive the jaws of the wrench in adjusting the cap screw 6.

The split portion between the ends 5, of the nut and adjacent to the threaded opening is adapted to form a longitudinally extending rib 7, along the threads of the bolt, as shown in Figs. 1 and 4, when the ends 5, of the lock nut have been drawn up to their locked position, thereby securely locking the nut upon the bolt and preventing it from turning rearwardly or becoming loose.

In the modified form of lock nut shown in Fig. 4, the split portion $5^d$, between the ends 5, is continued into the opposite threaded or rear walls of the lock nut as at $5^e$, thereby forming a second gripping portion to form a second rib $7^a$, along the threads when the lock nut is clamped in its locking position.

From the foregoing description, taken in connection with the accompanying drawings, the operation and advantages of our invention will be readily understood.

Having thus described some of the embodiments of our invention, what we claim and desire to secure by Letters Patent is,—

1. A lock-nut blank, comprising an elongated strip having a curved threaded portion on one side and spaced projections on the other and terminating in perforated ends one of which is inset and the other threaded.

2. A lock-nut blank, comprising an elongated strip curved and threaded on one side and having spaced angular projections on the other, the ends of said body being provided with openings, said curved threaded side being adapted to form the threaded nut opening and said projections the corners of the nut when the blank is formed up.

In testimony whereof we have affixed our signatures in presence of two witnesses.

DWIGHT GAST.
AMBROSE WERTZ.

Witnesses for Gast:
 R. L. SHERIDAN,
 H. F. WALKEMEYER.
Witnesses for Wertz:
 ELMER ELEY,
 W. G. BRUMBAUGH.